Sept. 8, 1953 T. F. S. HARGREAVES ET AL 2,651,684
AUTOMATIC SIGNAL ATTENUATOR
Filed April 6, 1949 3 Sheets-Sheet 1

INVENTORS
THOMAS F. S. HARGREAVES
WILLIAM F. GOULD
BY [signature]
ATTORNEY

INVENTORS
THOMAS F. S. HARGREAVES
WILLIAM F. GOULD
BY R P Morris
ATTORNEY

Sept. 8, 1953 T. F. S. HARGREAVES ET AL 2,651,684

AUTOMATIC SIGNAL ATTENUATOR

Filed April 6, 1949 3 Sheets-Sheet 3

INVENTORS
THOMAS F. S. HARGREAVES
WILLIAM F. GOULD
BY R.P. Morris
ATTORNEY

Patented Sept. 8, 1953

2,651,684

UNITED STATES PATENT OFFICE 2,651,684

AUTOMATIC SIGNAL ATTENUATOR

Thomas Frederick Stanley Hargreaves and William Frederick Gould, London, England, assignors to International Standard Electric Corporation, New York, N. Y., a corporation of Delaware Application April 6, 1949, Serial No. 85,862
In Great Britain April 9, 1948

6 Claims. (Cl. 179—84)

Figure 1:
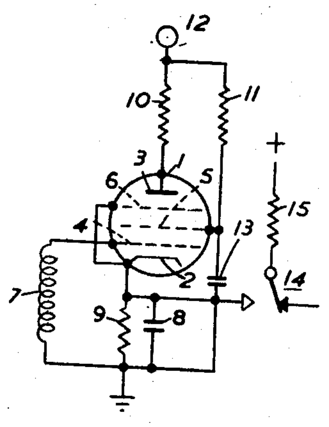

This invention relates to alternating current electric signal receiving equipment for telecommunication and its object is to improve signalling conditions in such circuits.

According to the invention there is provided alternating current electric signal receiving equipment for telecommunication networks in which supervisory signals and the like are transmitted by means of voice frequencies over a channel normally used for speech and in which an initial portion of a signal is adapted to introduce substantial attenuation into such a channel beyond the receiving equipment in the direction of transmission thereby to prevent effectively the transmission forward of the remainder of the signal intended solely for such receiving equipment, characterised by amplifier means in said channel beyond the receiving equipment and controlling circuits therefor, associated with said signal receiving equipment and adapted, in response to the said initial portion of signal to reduce substantially the signal transmission properties of the said amplifier means without mechanically opening the said channel.

Also according to the invention, there is provided alternating current electric signal receiving equipment for telecommunication networks in which supervisory signals and the like are transmitted by means of voice frequencies over a channel normally used for speech and in which an initial portion of a signal is adapted to introduce substantial attenuation into such a channel beyond the receiving equipment in the direction of transmission thereby to prevent effectively the transmission forward of the remainder of the signal intended for such receiving equipment, characterised by thermionic valve means in said channel beyond the receiving equipment and controlling circuits therefor, associated with said signal receiving equipment and adapted in response to the said initial portion of signal to reduce substantially the signal transmission properties of the said valve means without mechanically opening the said channel.

Further according to the invention, there is provided alternating current electric signal receiving equipment for telecommunication networks in which supervisory signals and the like are transmitted by means of voice frequencies over a channel normally used for speech and in which an initial portion of a signal is adapted to introduce substantial attenuation into such a channel beyond the receiving equipment in the direction of transmission thereby to prevent effectively the transmission forward of the remainder of the signal intended solely for such receiving equipment, characterised by saturable reactor means in said channel beyond the receiving equipment and direct current controlling means therefor associated with said signal receiving equipment and adapted, in response to the said initial portion of signal to reduce substantially the signal transmission properties through the said reactor means without mechanically opening the said channel.

The invention will now be described with reference to the accompanying drawing illustrating various embodiments. In the drawing, Figs. 1–7 show various ways of controlling the transmission of a signal through a thermionic valve by the operation of a relay contact controlled by a signal receiver, while Fig. 8 shows an embodiment using saturable reactors controlled by a relay contact in the direct current saturating circuit, and under the control of a signal receiver.

Before going on to describe these figures, some general discussion of the problem to be solved is desirable.

Present-day methods of signalling in telecommunication networks use, as is well known, one, two or a plurality of voice frequency alternating currents in various combinations of duration and order of frequency (in the case of a multi-frequency system) to establish the desired line conditions and to give the necessary supervisory signals.

When the line is also subject to "speech" frequencies, signal-receiving apparatus is liable to interference by spurious signals derived from the speech frequencies, and as a measure of immunity in such circumstances it is usual to prefix each signal by a special combination of frequencies (if a multi-frequency system) or of impulses of different durations (if a single-frequency system) not likely to be readily imitated in speech.

Such precautions are not necessary in the "signalling" only condition, but the "speech" condition is the one normally preferred in telephone networks for signalling, for technical reasons, and the prefix signal also serves to condition registers and the like for receiving the succeeding signal.

It is also important that a signal intended for one section of network and not at all for a succeeding section should be prevented from reaching such succeeding section, and it is a function of the prefix signal when provided, or the initial portion of the signal itself, immediately upon detection, to cause the line beyond the point of detection to be opened in some way, thereby preventing the signal being passed forward.

The term "opened" includes actual physical opening of the line by relay contacts as well as the introduction of attenuation or the reduction of gain, and the process is generally referred to as that of "line-splitting."

With an actual physical break in the circuit, transients are set up which travel in both sections of the line and appear as unpleasant and annoying clicks in subscribers' telephones, and since the initial portion of the prefix or signal is likely to be imitated frequently in ordinary conversation, spurious splitting is likely to occur with some frequency during a conversation. This spurious splitting is apt to have a bad psychological effect on the subscriber, causing dissatisfaction with the service but from a technical point of view, the transients caused by the line breaks are very undesirable since, combined with the initial portion of the prefix or signal which caused the split and which is inevitably passed forward, they may be mistaken in a subsequent section for a particular V. F. signal.

The other methods of line-splitting referred to are therefore of considerable importance and it is the object of the present invention to provide improved means of this character, based on the use of thermionic valves, and including in some cases a saturated reactor. Such a valve may be specially provided, or may be available, for instance, in existing receiving or signalling amplifiers, or in the buffer amplifiers described in Italian Patent No. 445,635. Such buffer amplifiers may be primarily one-way devices, having no intrinsic amplification from input terminals to output terminals.

In general, two methods, based on the use of a valve alone are available:

(I) by a change of electrode potential in the valve, so that the condition of operation of the valve is radically changed; and (II) by a change in the amount of negative feedback provided in the case of a negative feedback amplifier.

One particular application of method (I) is to associate a resistor-capacitor combination with any one of the electrodes of the thermionic valve so that by the controlled charging or discharging of the capacitor through the resistor, a smooth change of potential is provided. This method may be applied to any one of the electrodes of a triode or multi-electrode thermionic valve, and the change of state referred to is the "disabling" or "enabling" of the associated valve in as smooth and silent a manner as possible.

In regard to (II) a relay may be arranged to short-circuit a portion of the feedback arrangements (resistor, transformer or the like), of a single valve or of a group of valves, again providing a smooth change of gain in sufficient amount effectively to disable by attenuation any residual signal that may be passed on.

Figure 4:
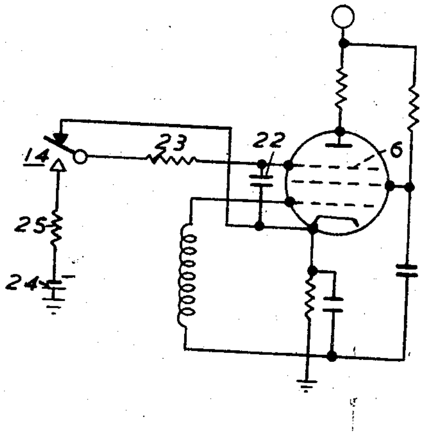
Figure 5:
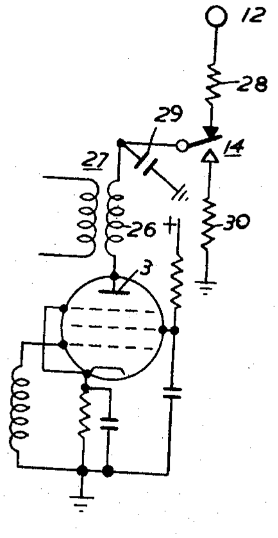
Figure 6:
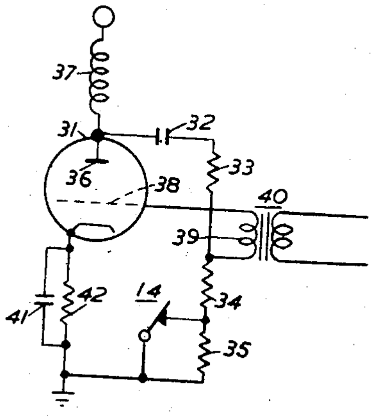
Figure 7:
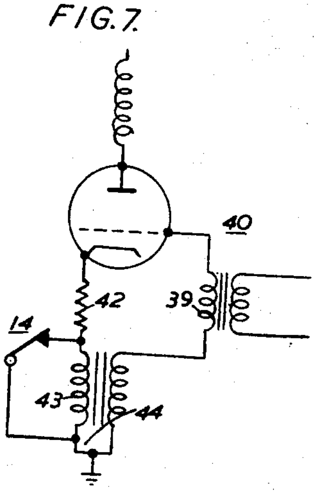
Figure 8:
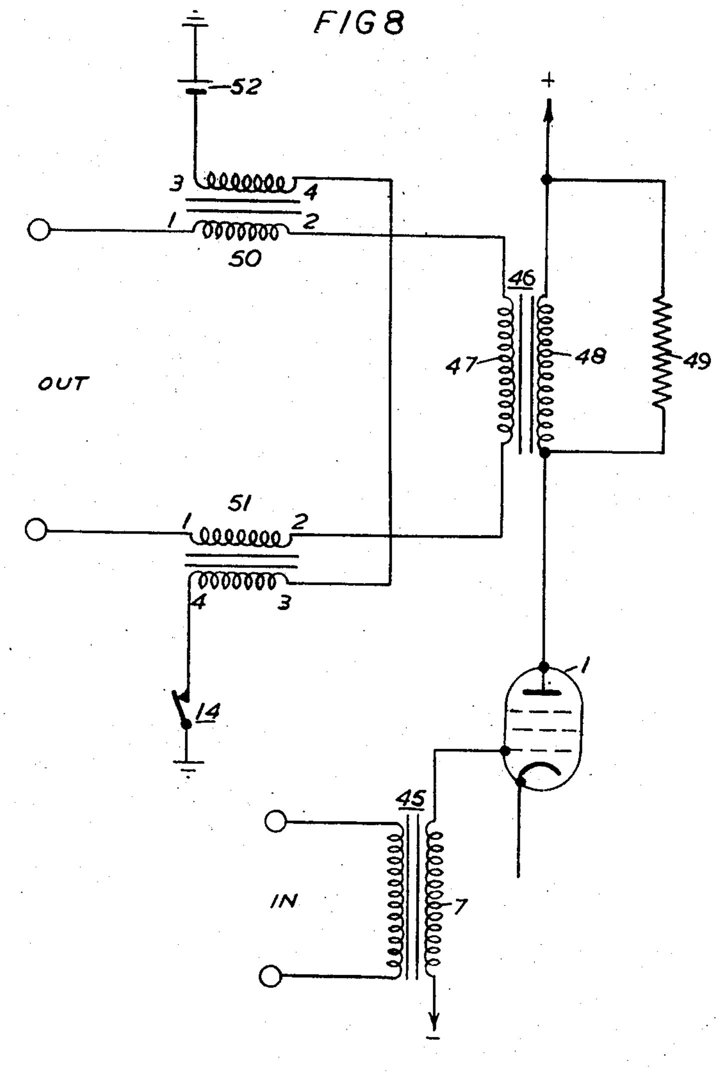

In the accompanying drawing, Figs. 1–5, examples are shown of the method described in (I) above applied separately to the several electrodes in turn of a pentode valve, and in Figs. 6 and 7, examples are shown of the method described in (II) above applied to an amplifier provided with voltage or with current feedback as the case may be.

Fig. 8 shows the application of a saturated reactor to the buffer amplifier valve as a non-limiting example of its use for "silent splitting."

Referring to Fig. 1, this shows a circuit arrangement in which the disabling effect is achieved at the cathode. Reference 1 represents a thermionic valve having a cathode 2, anode 3 and the usual grid electrodes, 4–6 respectively, and 7 represents the secondary of a signal input transformer feeding into the control grid 4 and the cathode 2 via the decoupling condenser 8. The auto-bias resistor 9 in the cathode circuit is connected to ground, and an anode load and screen grid resistor, represented at 10 and 11 respectively, are both fed from a common anode battery terminal 12; 13 is a screen-grid decoupling condenser.

Also connected to the cathode 2 is the front contact of a relay springset 14, the armature of which is fed through a resistor 15 from a source of positive potential, the back contact is unconnected.

This relay spring set is part of a relay in a V. F. receiver (e. g. relay XY and its contact $xy1$ shown in Fig. 2 of the copending U. S. Patent application of G. C. Hartley Serial No. 6329, filed on February 4, 1948, which responds to the receipt of the prefix or signal as described, and performs the splitting function in some way for example, as in that specification just referred to, by short-circuiting the line. In the embodiment now being described, the operation of the contact immediately increases the positive potential of the cathode, the actual change being made smooth by the charging process in the condenser 8. This is equivalent to increasing the negative potential of the grid, and the valve is accordingly disabled to an extent depending on the additional disabling bias provided and the disabling may be made sensibly complete.

Figure 2:
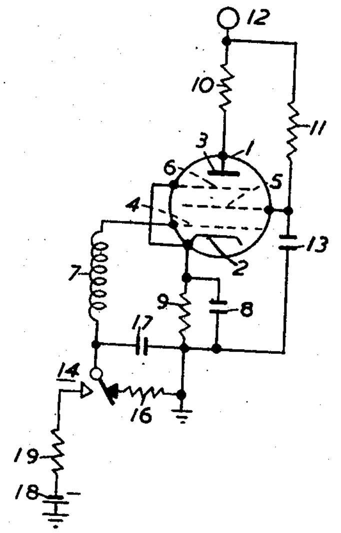

In Fig. 2, use is made of the control grid 4 in a similar way. Similar references to those in Fig. 1 are shown where applicable; in addition, there is provided the grid leak-condenser combination 16—17 coupling the lower end of the input transformer winding 7 to the cathode, and co-operating with the springset 14.

In this case, the grid leak is connected normally in circuit via the back-contact and armature of the relay spring set 14, and on operation, the armature breaks the grid leak circuit deriving grid potential from the auto-bias resistor 9, and transfers the grid connection to a source of grounded negative potential 18 applied through a suitable resistor 19.

Again, the action is graduated by the charging process in condenser 17, the additional negative bias serving to disable the valve more or less completely.

Note that in this case, the springset 14, should preferably be of the make-before-break type to avoid a momentary break in the bias condition.

Figure 3:
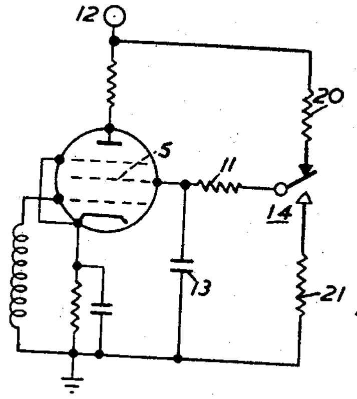

In Fig. 3 it is the screen-grid 5 which is operated upon for disabling the valve. The resistor 11 is here taken to the anode battery via the armature and back contact of the springset 14 and an additional resistor 20 (which may be part of 11) while the front contact of 14 is grounded via resistor 21.

On operation of the relay contact 14, the screen is disconnected from the anode battery, and the condenser 13 is discharged via resistor 21, thereby completely disabling the valve in a gradual manner. As before, springset 14 should preferably be make-before-break.

In Fig. 4 the potential of the suppressor grid 6 is varied to obtain the disabling effect. The suppressor grid is connected directly to the cathode via condenser 22, and also via the armature and back contact of springset 14, and a suitable resistor 23.

Under normal conditions, the suppressor has the potential of the cathode, but when the springset 14 is operated, a negative potential from source 24 is applied through resistor 25 to the suppressor grid, the charging of condenser 22 allowing the process to be gradual.

As in previous cases, the springset 14 should be make-before-break type.

Lastly, in this series, Fig. 5 shows the method applied to the anode 3. Here a little more detail is shown than heretofore, the anode load 10 being replaced by the primary 26 of output transformer 27 and the anode battery connected via resistor 28 and back contact and armature of springset 14. Condenser 29 provides a decoupling for the resistor 28 and also takes part in the gradual cut-off process.

When the springset 14 is operated by the relay in the V. F. receiver, the anode connection to the battery is changed over to a grounded connection via resistor 30, the grounding of the anode taking place gradually as condenser 29 discharges. As before, springset 14 should be make-before-break type to avoid a sudden break in the anode circuit.

Thus in all these cases, the cut-off, or disabling of the valve, is accomplished slowly with the change in the state of charge of a condenser and the desired break in the transmission which includes this valve, is accomplished electronically and without the setting up of undesirable transients or clicks.

Figs. 6 and 7 show two embodiments in which the feedback of a valve amplifier may be modified to reduce the transmission equivalent of a link.

In Fig. 6, the valve 31 shown as a triode, though this is not a necessary limitation, is part of an amplifier—which may be the blocking amplifier referred to in the above-mentioned Italian Patent No. 445,635, or an auxiliary V. F. amplifier, in the receiver path, or other convenient amplifier—provided with a negative feed-back path comprising blocking condenser 32, and potentiometer 33—34—35. This feed back path breaks down the anode A. C. potential developed at the anode 36 by load inductor 37, and the fraction developed across the portion 34 is fed to the grid 38 of the valve via the secondary 39 of input transformer 40. The lowest portion 35 of the potentiometer is normally short-circuited by the springset shown, which will still be referred to as 14 as it is performing an identical function to that formerly described. The feedback path to the cathode is completed via this springset and decoupling condenser 41 for the bias resistor 42.

When springset 14 is operated by the relay in the V. F. receiver, the lowest portion 35 is opened up and adds its potential to the negative feedback potential applied to the grid of the valve, thereby reducing the gain of the amplifier in the ratio of the feedback added. This may conveniently be made 20–30 db, and thus the transmission equivalent of the through path may be reduced below the point at which a signal, if passed on, would cease to be recognised as a signal.

The break, though not complete, is electronically made and is essentially noiseless.

Fig. 6 showed the application of method (II) to a feedback amplifier having negative voltage feedback: in Fig. 7 is shown the analogous case derived from the cathode circuit.

In this figure, identical components to those in Fig. 6 are shown with identical reference numbers. Decoupling condenser 41, however, is now omitted to provide normal negative current feedback from cathode resistor 42, while additional current feedback may be derived in the inductive reactance of primary winding 43 of the transformer 44 and transferred in the correct phase through the transformer to the grid circuit.

However, this additional source is normally short circuited by springset 14, and only brought into use when the relay in the V. F. receiver controlling 14 is operated. The additional feedback effect so derived serves to reduce the amplifier gain, and so reduce the transmission equivalent of the forward signalling path of which the amplifier forms a part.

Adequate feedback is more difficult to attain by this method than by voltage feedback, but both methods have their own particular field of use.

Turning now to Fig. 8, this shows a buffer amplifier valve 1 fed from the winding 7 of an input transformer 45 inserted in the incoming channel of a 4-wire telecommunication system, in the manner disclosed in the Italian patent above referred to, namely Patent No. 445,635, and the anode transformer 46 feeds at its secondary 47 the line to both the 4-wire/2-wire terminating set (not shown). The primary 48 is loaded with a line impedance matching resistor 49. The anode circuit may also include the necessary selecting and guard circuits of the V. F. receiver proper, or these may be supplied from an independent amplifier fed from transformer 45, in the manner disclosed in U. S. Patent No. 2,577,755.

The connection from the secondary of transformer 46 is taken via two similar double-wound inductances 50, 51, the 1—2 windings of which carry the speech currents and have considerable impedance due to their inductance. The windings 3—4 of 50 and 51 are also similar and carry direct current derived from a battery source 52 and applied via the relay contact 14 which, as in previous cases, is the contact of the "splitting" relay, i. e. the relay in the V. F. receiver previously referred to.

The windings 3—4 are so poled in the circuit in relation to the windings 1—2 that inductive effects from 3—4 into 1—2 are opposed in the two cases, and therefore cause no resulting signal to be passed forward to the 4-wire/2-wire set.

Under normal conditions, contact 14 is closed and the current flowing in the 3—4 windings is sufficient to saturate the 1—2 windings so that their impedance is negligibly small, and minimum attenuation is inserted in the speech path. When a prefix is received however, contact 14 breaks, the D. C. path is interrupted and the impedances of the two inductances attain their maximum values, and thereby insert sufficient attenuation in the speech path to render useless any signals passed on.

The opposing connections of the D. C. windings on the two inductances ensure that no inductive surges are passed forward on the make or break of the D. C. circuit to render the change noisy.

While the principles of the invention have been described above in connection with specific embodiments and particular modifications thereto, it is to be clearly understood that this description is made only by way of example and not as a limitation on the scope of the invention.

What we claim is:

1. In a telecommunication system having a transmission channel and a selective receiving station coupled thereto, an arrangement for automatically attenuating portions of said channel beyond said station in response to predetermined signals sent over said channel to said station, comprising control means in said channel connected beyond and associated with said station in the direction of transmission, said control means being operative to block a portion of said channel beyond said station, circuit means operative to actuate said control means, relay means including a contact connected to said station and operable in response to said predetermined signals, said contact coupled between said control means and said circuit means whereby in response to said predetermined signals, said control means are operated under control of said contact.

2. The arrangement as set forth in claim 1 wherein said control means comprises an electron discharge device being normally maintained in a conductive condition and said circuit means includes a source of biasing potential connectable to said discharge device by said relay contact to render said discharge device non-conductive.

3. The arrangement as set forth in claim 2 wherein said discharge device is a pentode having an anode, a cathode and three control grids, said relay contact being operative to connect said source of biasing potential to one of said control grids.

4. The arrangement as set forth in claim 2 wherein said discharge device is a pentode having an anode, a cathode and three control grids, said relay contact being operatively connected to apply said source of biasing potential to said anode.

5. The arrangement as set forth in claim 2 wherein said discharge device is a pentode having an anode, a cathode and three control grids, said relay contact being operatively connected to apply said source of biasing potential to said cathode.

6. In a telecommunication system having a transmission channel and a selective receiving station coupled thereto, an arrangement for automatically attenuating portions of said channel beyond said station in response to predetermined signals sent over said channel to said station, comprising a plurality of saturable reactors connected to said channel beyond and associated with said station in the direction of transmission, means normally operative to bias said reactors to a low impedance condition, relay means connected to said station operable in response to said predetermined signals, said relay means having a contact coupled between said reactors and said circuit means, said control means operative to disconnect said biasing means from said saturable reactors under control of said contact.

THOMAS FREDERICK STANLEY HARGREAVES.
WILLIAM FREDERICK GOULD.

References Cited in the file of this patent

UNITED STATES PATENTS

| Number | Name | Date |
|---|---|---|
| 1,691,076 | Mathes | Nov. 13, 1928 |
| 1,976,096 | Ryall | Oct. 9, 1934 |
| 2,031,942 | Duguid | Feb. 25, 1936 |
| 2,106,785 | Augustadt | Feb. 1, 1938 |
| 2,372,419 | Ford | Mar. 27, 1945 |
| 2,382,097 | Purlington | Aug. 14, 1945 |
| 2,430,457 | Dimond | Nov. 11, 1947 |
| 2,463,073 | Webb | Mar. 1, 1949 |

OTHER REFERENCES

TM 11-827, Fig. 7 (Army Manual) (V5).